(12) United States Patent
Bletsch et al.

(10) Patent No.: US 7,979,729 B2
(45) Date of Patent: Jul. 12, 2011

(54) METHOD FOR EQUALIZING PERFORMANCE OF COMPUTING COMPONENTS

(75) Inventors: Tyler K. Bletsch, Raleigh, NC (US); Wesley M. Felter, Austin, TX (US); Neven A. Gazala, Pittsburgh, PA (US); Tibor Horvath, Charlottesville, VA (US); Charles R. Lefurgy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/947,017

(22) Filed: Nov. 29, 2007

(65) Prior Publication Data

US 2009/0144566 A1    Jun. 4, 2009

(51) Int. Cl.
G06F 1/00 (2006.01)
G06F 11/30 (2006.01)

(52) U.S. Cl. ............ 713/340; 713/300; 713/320; 700/4; 700/28; 700/29; 700/31

(58) Field of Classification Search .................. 713/300, 713/322, 340; 700/4, 28, 29, 31
See application file for complete search history.

(56) References Cited

U.S. PATENT DOCUMENTS

| 7,155,623 | B2 | 12/2006 | Lefurgy et al. | |
| 7,200,824 | B1* | 4/2007 | Sidhu et al. ...................... | 716/5 |
| 7,386,739 | B2* | 6/2008 | Ghiasi et al. .................. | 713/300 |
| 7,647,516 | B2* | 1/2010 | Ranganathan et al. ....... | 713/320 |
| 2004/0117680 | A1* | 6/2004 | Naffziger ..................... | 713/322 |
| 2005/0138440 | A1* | 6/2005 | Barr et al. ..................... | 713/300 |
| 2006/0156042 | A1 | 7/2006 | Desai et al. | |
| 2006/0253715 | A1* | 11/2006 | Ghiasi et al. .................. | 713/300 |
| 2006/0288241 | A1 | 12/2006 | Felter et al. | |
| 2007/0050650 | A1* | 3/2007 | Conroy et al. ................ | 713/300 |
| 2008/0082844 | A1* | 4/2008 | Ghiasi et al. .................. | 713/323 |
| 2008/0104428 | A1* | 5/2008 | Naffziger et al. ............. | 713/300 |
| 2009/0138737 | A1* | 5/2009 | Kim et al. ..................... | 713/322 |

OTHER PUBLICATIONS

W. Felter et al, "A Performance-Conserving Approach for Reducing Peak Power Consumption in Server Systems," Proc. of the 19th Int'l. Conference on Supercomputing, pp. 293-302 (2005).
P. Ranganathan et al., "Ensemble-Level Power Management for Dense Blade Servers," Proc. of the 33rd Int'l. Symposium on Computer Architecture, pp. 66-77 (2006).
C. Lefurgy et al., "Server-level Power Control," Proc. of the 4th Int'l. Conference on Autonomic Computing (Jun. 2007).
U.S. Appl. No. 11/938,834.

* cited by examiner

*Primary Examiner* — Thomas Lee
*Assistant Examiner* — Jaweed A Abbaszadeh
(74) *Attorney, Agent, or Firm* — Libby Z. Toub; Jack V. Musgrove

(57) ABSTRACT

A performance measure (e.g., processor speed) for computing components such as servers is optimized by creating models of power consumption versus the performance measure for each server, adding the power models to derive an overall power model, and calculating an optimum set point for the performance measure which corresponds to a power limit on the servers using the overall power model. The set point is then used to set power budgets for the servers based on their power models, and the servers maintain power levels no greater than their respective power budgets. The server power models are preferably created in real time by monitoring power consumption and the performance measure to derive sets of data points for the servers, and performing regression on the sets of data points to yield power models for the servers. Multiple server power models may be created for different program applications.

18 Claims, 4 Drawing Sheets

METHOD FOR EQUALIZING PERFORMANCE OF COMPUTING COMPONENTS

BACKGROUND OF THE INVENTION

1. Field of the Invention

The present invention generally relates to computer systems, and more specifically to methods and systems for power management of high performance computing centers such as server systems having multiple servers which work together to carry out program applications.

2. Description of the Related Art

Power management has become a dominant concern in the development of data processing systems and the design of data center facilities. In recent years, a trend in server design is to make the servers physically smaller and pack them densely in a rack. A typical format is the blade server. Several blade servers share common power, cooling, network, and I/O infrastructure from a single blade chassis. This construction allows these shared components to largely be removed from the blade design and allows computing components such as microprocessors and dynamic random access memory (DRAM), both of which consume large amount of power in servers, to be more densely packed on the blade-level and rack-level. Data centers which were designed for the power consumption levels of a previous generation of data processing systems are often not able to be filled to the physical capacity with these newer servers and many racks may be left partially-filled or even empty. In certain geographies, it can be cost prohibitive to provide additional power resources to the data center. Therefore, it is important to manage power consumption by using the available power efficiently so that workload performance is maximized within the available power limit.

Various techniques have been devised to better manage power usage, including power capping. Power capping keeps a server from going above a specified power consumption level by slowing down the server's processor under conditions when the server would ordinarily use too much power. This feature is commonly employed in the IBM Systems Director Active Energy Manager product to meet available-power requirements for IBM System X servers. The Active Energy Manager communicates a user-selected power cap to firmware running on the server. Firmware in the IBM System x server is responsible for controlling the server performance-state so that the power cap is maintained. For example, a system having six identical servers may be limited to a cluster power cap of 750 watts, or a power budget of 125 watts per server. The servers could perform better if they were allowed to run at a higher speed, but the maximum speed would result in power usage of around 140 watts per server, exceeding the cap. The power cap thus represents an attempt to balance power usage versus performance.

It is important to make the most efficient use of whatever power cap is assigned to achieve superior system performance. There are, however, still inefficiencies in the budgeting of power for distributed computing systems such as server data centers. Essentially identically configured servers having the same power budgets often do not operate at the same performance levels. Discrepancies caused by, e.g., wafer-level process variations or differences in ambient temperature can lead to individual components (microprocessors or memory) consuming different amounts of power when running at the same speed. Thus, even if equal power budgets are assigned to all the servers, the power management tool may be required to set the servers to different operating speeds to achieve the budget. One server is accordingly slower than the rest, and this server is a processing bottleneck, i.e., the speed of the slowest server dominates the required run time. This problem is particularly pronounced for scientific program applications which commonly partition the workload into equal size pieces that are evenly distributed among the servers for parallel processing. In the situation where all servers have the same power budget, overall system performance is constrained by the slowest server.

In light of the foregoing, it would be desirable to devise a power budgeting technique for high performance computing systems that could more efficiently utilize system resources to their fullest extent for given power limitations. It would be further advantageous if the method could be implemented in existing power-constrained data center facilities without expensive infrastructure upgrades.

SUMMARY OF THE INVENTION

It is therefore one object of the present invention to provide an improved method of power management for a distributed computing system, e.g., a server system, which assigns individual power budgets to system components.

It is another object of the present invention to provide such a method which can dynamically adapt to power consumption changes resulting from configuration changes, workload changes, or changes in the operating environment.

It is yet another object of the present invention to provide a method for equalizing performance of computing components for a given power cap.

The foregoing objects are achieved in a method of optimizing a performance measure for computing components such as servers by creating server power models of power consumption versus the performance measure, adding the server power models to derive a cluster power model, and calculating an optimum set point for the performance measure which corresponds to a power limit on the servers using the cluster power model. The set point is then used to set power budgets for the servers based on the server power models, and the servers maintain power levels no greater than their respective power budgets. The server power models are preferably created in real time by monitoring power consumption and the performance measure to derive sets of data points for the servers, and performing regression on the sets of data points to yield power models for the servers. Multiple server power models may be created for different program applications. In the illustrative implementation the performance measure is processor speed.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
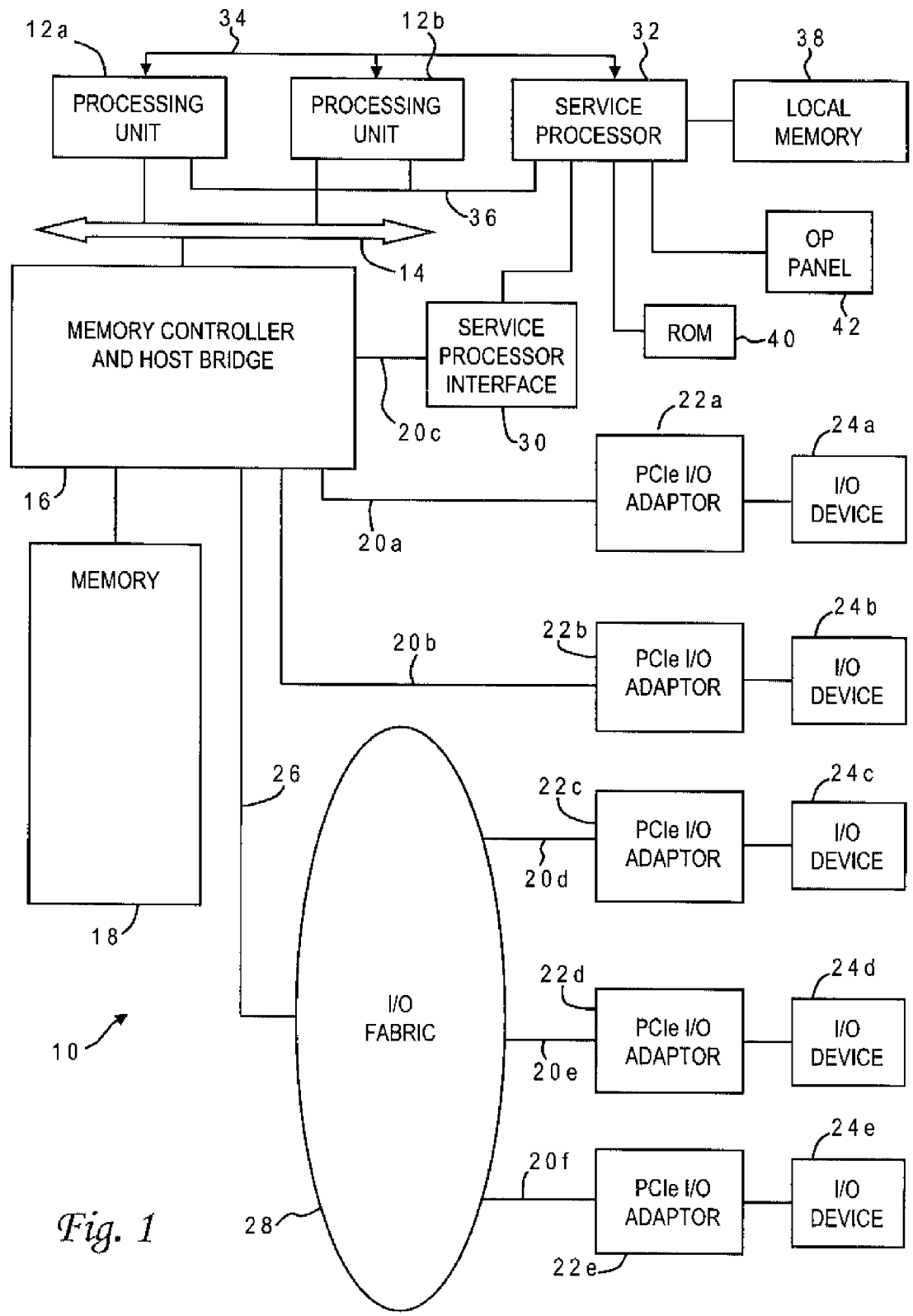
FIG. 1 is a block diagram of one embodiment of a computer system which may operate as a server and is assigned a power budget in accordance with the present invention.

With reference now to the figures, and in particular with reference to FIG. 1, there is depicted one embodiment 10 of a computer system constructed in accordance with the present invention. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. In the illustrative implementation, computer system 10 is a server. Any of the components of server 10, and in particular processors 12a, 12b, may be provided as field-replaceable units. While only two processors 12a, 12b are shown, for high performance computing server 10 may have as many as 16 processors.

MC/HB 16 has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (e.g., hard disk drive which stores a program embodying the invention and various computational results) or an array of such storage devices, an optical disk drive, and a network card which connects server 10 to a remote client over a network. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via an I2C interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments server 10 may include modifications of these hardware components or their interconnections, or additional components, so the depicted example should not be construed as implying any architectural limitations with respect to the present invention.

Figure 2:
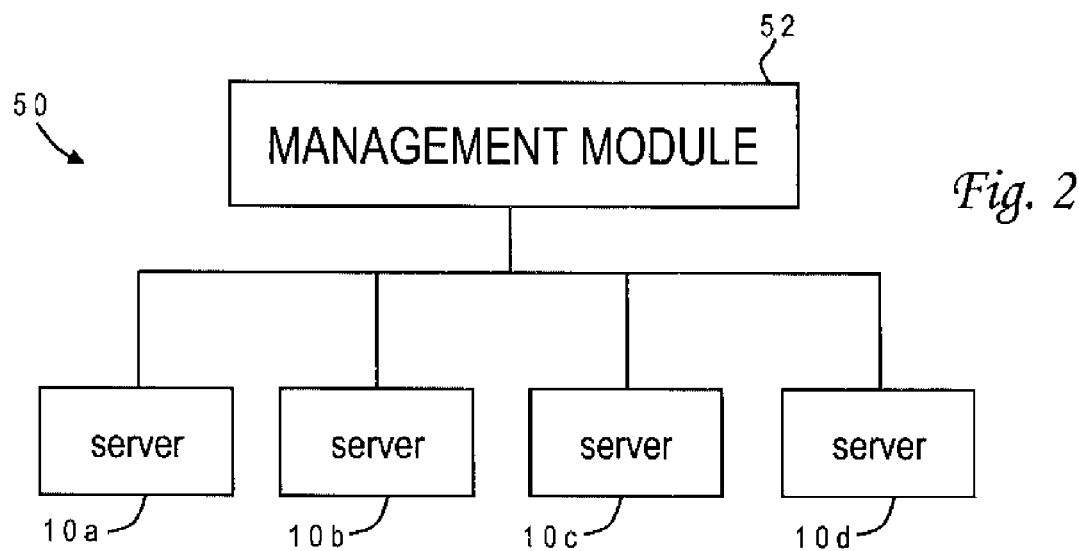
FIG. 2 is a block diagram of a server system which includes multiple servers and a management module that carries out one or more steps of server performance equalization in accordance with one implementation of the present invention.

With further reference to FIG. 2, a data processing system 50 is depicted having a plurality of computing components includes a cluster of servers 10a, 10b, 10c, 10d and a management module 52. Management module 52 provides power management functions according to various embodiment of the invention as explained further below, and may provide other server management functions. Servers 10a, 10b, 10c, 10d are preferably blade style and co-located in a common rack. Management module 52 may have the same construction as server 10 shown in FIG. 1 but with different programming, and is also in a blade chassis mounted in the same rack. Servers 10a, 10b, 10c, 10d and management module 52 may be connected via a local area network.

Management module 52 assigns a power cap or limit for the overall power usage by the cluster of servers 10a, 10b, 10c, 10d according to known techniques, or alternatively receives the power cap from a user workstation connected to the network or from an operator console attached to management module 52. The power cap may be selected based on thermal requirements or available power. Management module 52 then adjusts the individual power budgets given to each server so that all of the servers run at the same performance level while ensuring that the budgets adhere to the global power cap. Management module 52 carries out the budget adjustments in the exemplary embodiment, but those skilled in the art will appreciate that the performance equalization algorithm of the present invention could alternatively be carried out in part or in whole at one of the other computing components (servers 10a, 10b, 10c, 10d). The performance equalization functions within a server are preferably handled by service processor 32.

Figure 3:
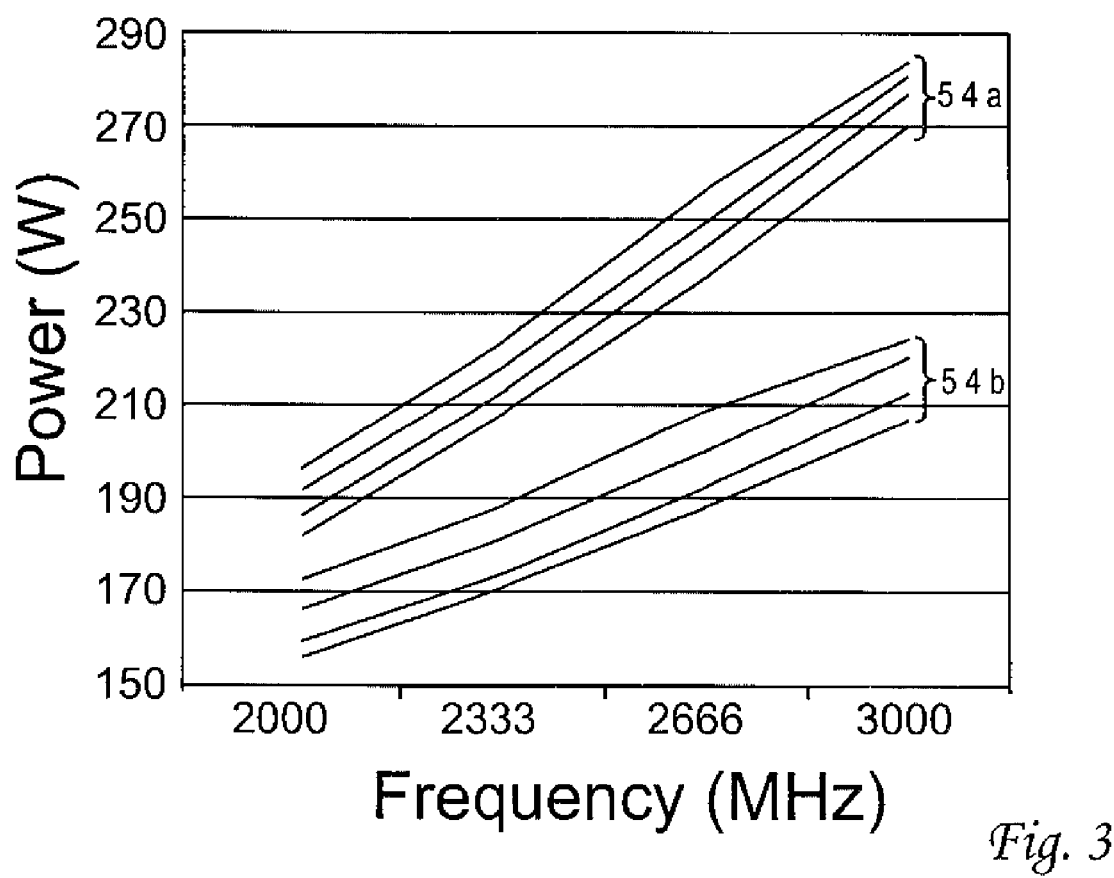
FIG. 3 is a graph illustrating exemplary power usage versus performance (processor speed) of multiple servers for two different program applications.

In order to optimize the budgets to account for variations in operating speeds, management module 52 employs models of power usage versus performance for each server 10a, 10b, 10c, 10d. The models may be provided to management module 52 by a user, but in the preferred implementation of the present invention the models are advantageously created and dynamically revised in real-time. Each model may be constructed by monitoring a performance measure along with power consumption as seen in FIG. 3. Sets of data points for each server running a first program application form four roughly linear power models 54a. In this example the functions are based on the operating frequency of the processor, but the performance measure may alternatively be a processor speed normalized to a nominal frequency.

The data points for each server are used to construct a linear function using regression, e.g., least-squares, so each power function can be expressed as $$P_i(s) = A_i * s + B_i$$

where $A_i$ and $B_i$ are a pair of computed constants for each server i. This example should not be construed as limiting since other types of regression methods could be used or higher-order models could be constructed. In the preferred embodiment each server computes its own model and transmits it to management module 52, i.e., by sending the parameters A and B. Alternatively, the servers can send periodic measurements of power usage and speed to management module 52 which can perform the regression analysis.

Construction of the power versus performance models may be deferred for a short time until a sufficient number of data points have been collected, or an initial model may be employed that utilizes only two data points—a single measured power and operating frequency, and data point (0,0). More complex (nonlinear) models may be used. In lieu of actual power measurements, power usage can be estimated using calibration techniques based on controlled levels of power supply regulators.

Different models can be provided for specific software applications. FIG. 3 illustrates additional sets of data points that form another four roughly linear power models 54b. These data points are used to compute another set of A and B constants. The server operating system is programmed to associate different sets of A and B constants with the respective application currently running.

Figure 4:
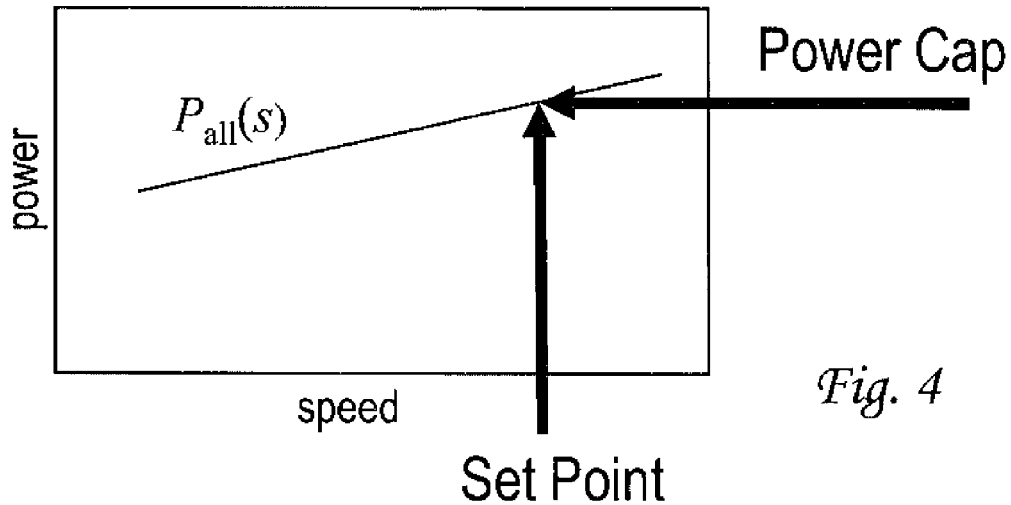
FIG. 4 is a graph illustrating a function of cluster power versus performance which is used to find a speed set point corresponding to the cluster power cap.

Once management module 52 has received the current server power models, it sums the models together to create a cluster power model $P_{all}(s)$, i.e., $$P_{all}(s)=P_1(s)+P_2(s)+\ldots+P_n(s)$$

where n is the number of servers. This function is further illustrated in FIG. 4. Some point along this function corresponds to the cluster power cap assigned to server system 50, and has an associated speed set point S. The value of the speed set point may be calculated using binary search on s. For example, management module 52 can begin with a trial speed of 1 GHz and if the cluster power function is still below the power cap (the cluster power budget) then try a speed of 2 GHz, and if the cluster power function is then above budget try 1.5 GHz, etc. The speed S is used as the set point for all of the servers, and management module 52 sets a budget of $P_i(S)$ using the previously constructed models for each server i. Management module 52 sends the respective budgets to each server 10a, 10b, 10c, 10d. The power capping controller on each server selects the operating speed of the server so that the power budget is not exceeded. This selection of the set point maximizes performance for a given cluster power budget.

The entire procedure of modeling the servers' power consumption with respect to performance, constructing the cluster power function, finding the speed set point, and computing and transmitting the server power budgets occurs during a single control interval, and these steps are preferably repeated periodically, e.g., every 1 second, to update the models and budgets in real time with each iteration. Updates could also be triggered by an application change, a cluster power budget change, or any other event that affects power or speed. This real-time updating allows the system to dynamically adapt with changes in workload, ambient temperature, etc.

Figure 5:
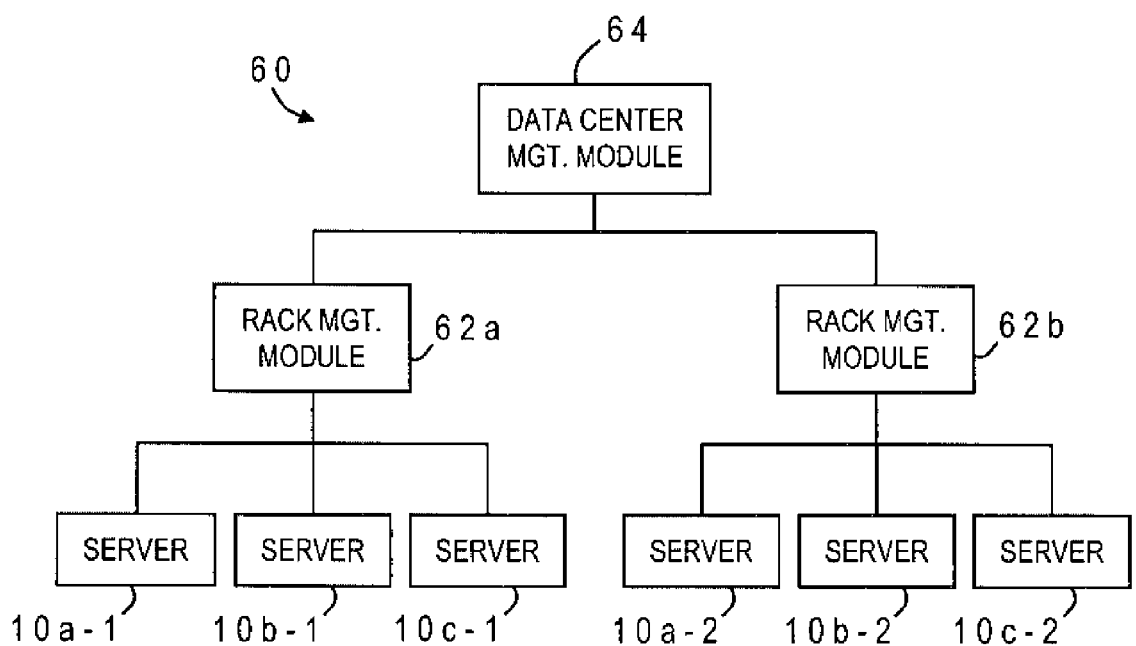
FIG. 5 is a block diagram of one embodiment of a data center having servers which are arranged in multiple clusters in racks and are optimized using performance equalization in accordance with the present invention.

The present invention can be easily scaled for larger data centers having multiple server clusters as illustrated in FIG. 5. Data center 60 has two server clusters, one including servers 10a-1, 10b-1 and 10c-1, and the other including servers 10a-2, 10b-2 and 10c-2. A first rack management module 62a communicates with servers 10a-1, 10b-1 and 10c-1, and a second rack management module 62b communicates with servers 10a-2, 10b-2 and 10c-2. A data center module 64 is in further communication with rack management modules 62a, 62b forming a pyramid structure. Power budgets are communicated downwardly in this structure, while model parameters (or frequency and power consumption) are communicated upwardly. The sum of the server power models for servers 10a-1, 10b-1 and 10c-1 is used to create a first cluster power model, and the sum of the server power models for servers 10a-2, 10b-2 and 10c-2 is used to create a second cluster power model. The combined first and second cluster power models yield a data center power model. The performance equalization algorithm is then performed by each management (non-leaf) node (rack management modules 62a, 62b and data center management module 62) using data transmitted by its immediate children nodes (the servers at the rack or chassis level, or rack management modules 62a, 62b at the data center level). This structure can be expanded horizontally with more than two server clusters and vertically with multiple management levels. The invention can further be applied at a smaller scale, e.g., within a server to manage multiple processors or other components of the server.

Figure 6:
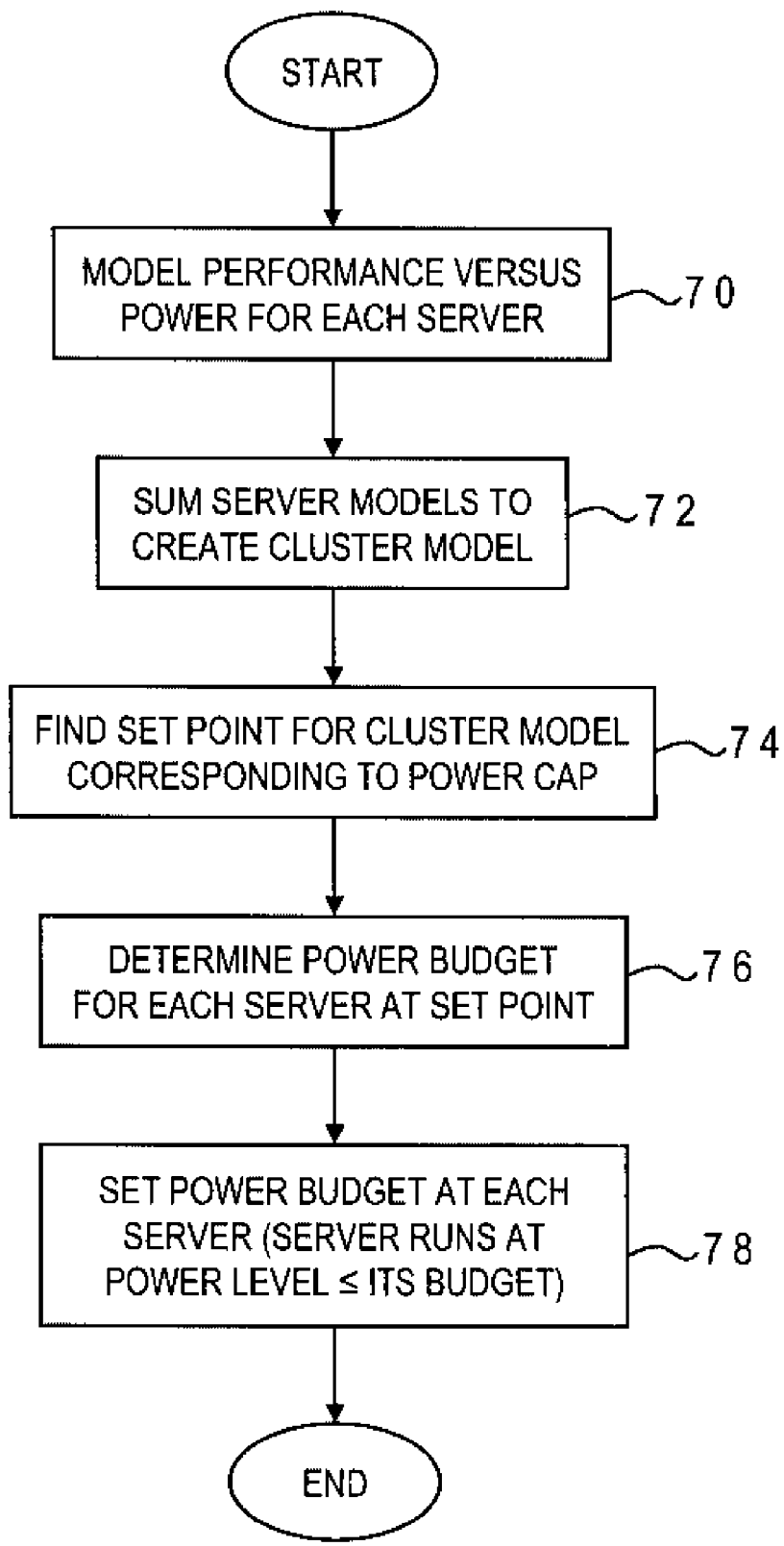
FIG. 6 is a flow chart illustrating a method for equalizing performance of computing components in accordance with one implementation of the present invention.

The present invention may be further understood with reference to FIG. 6 which illustrates the logical flow according to one implementation for equalizing performance of computing components. The process begins by modeling performance versus power for each server, or non-leaf node in a multi-level system (70). The server power models are added to create a cluster power model (72). The speed set point value for the cluster power function corresponding to the power cap is calculated using binary searching (74), and power budgets are determined for each server at the set point (76). The management module then sets the power budgets at each server and the servers maintain a power level no greater than their respective budgets (78).

The present invention thus advantageously optimizes performance in a server system for a given power cap, without the need for any additional infrastructure. This optimization is counterintuitive since it results in allocating the most power to the least efficient component. The computational efficiencies realized by the present invention are particularly significant in high performance computing applications. Experiments indicate that scientific workloads running in parallel on load-balanced servers will complete 10%-20% faster using performance equalization. The present invention may further be used as a building block for composing more complex power management policies.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while performance has been discussed in terms of server microprocessor speed, it could encompass other measures of performance such as the number of floating-point operations (gigaflops). It is therefore contemplated that such modifications can be made without departing from the spirit or scope of the present invention as defined in the appended claims.

What is claimed is:

1. A method of optimizing a performance measure for a cluster of computing components in a distributed computing system, comprising:

creating different component power models of power consumption versus the performance measure for the computing components;

adding the component power models to derive a cluster power model;

calculating an optimum set point for the performance measure which corresponds to a power limit on the computing components using the cluster power model; and setting individual power budgets for the computing components based on the optimum set point and the component power models such that each of the computing components operate at a generally equal performance level according to the performance measure, wherein said setting includes allocating a greatest power budget to a least efficient one of the computing components.

2. The method of claim 1 wherein the component power models are created in real time by monitoring power consumption and the performance measure to derive sets of data points for the computing components, and performing regression on the sets of data points to yield power models for the computing components.

3. The method of claim 1 wherein multiple component power models are created for different program applications carried out by the computing components.

4. The method of claim 1 wherein the optimum set point is calculated using binary searching of the cluster power model against the power limit.

5. The method of claim 1 wherein the computing components have one or more processors and the performance measure is processor speed.

6. A method of assigning power budgets to servers in a cluster of a server system, comprising:
creating different server power models of power consumption versus a performance measure for the servers;
adding the server power models to derive a cluster power model;
calculating an optimum set point for the performance measure which corresponds to a power limit on the servers using the cluster power model; and
setting individual server power budgets based on the optimum set point and the server power models such that each of the servers operate at a generally equal performance level according to the performance measure, wherein said setting includes allocating a greatest server power budget to a least efficient one of the servers.

7. The method of claim 6 wherein the server power models are created in real time by monitoring power consumption and the performance measure to derive sets of data points for the servers, and performing regression on the sets of data points to yield power models for the servers.

8. The method of claim 6 wherein multiple server power models are created for different program applications carried out by the servers.

9. The method of claim 6 wherein the performance measure is processor speed.

10. A data processing system comprising a plurality of computing components which carry out a distributed computing workload, wherein at least one of said computing components derives a cluster power model from different component power models of power consumption versus a performance measure for said computing components, calculates an optimum set point for the performance measure which corresponds to a power limit on said computing components using the cluster power model, and sets individual power budgets for said computing components based on the optimum set point and the component power models such that each of the servers operate at a generally equal performance level according to the performance measure, wherein a greatest power budget is allocated to a least efficient one of the computing components.

11. The data processing system of claim 10 wherein:
said computing components include a cluster of servers and a management module;
the component power models are server power models created by said servers; and
the optimum set point is calculated by said management module.

12. The data processing system of claim 10 wherein the component power models are created in real time by monitoring power consumption and the performance measure to derive sets of data points for the computing components, and performing regression on the sets of data points to yield power models for the computing components.

13. The data processing system of claim 10 wherein multiple component power models are created for different program applications carried out by the computing components.

14. The data processing system of claim 10 wherein the optimum set point is calculated using binary searching of the cluster power model against the power limit.

15. The data processing system of claim 10 wherein the computing components have one or more processors and the performance measure is processor speed.

16. A computer program product comprising:
a computer-readable storage medium; and
program instructions residing in said storage medium for optimizing a performance measure for a cluster of computing components in a distributed computing system by creating different component power models of power consumption versus the performance measure for the computing components, adding the component power models to derive a cluster power model, calculating an optimum set point for the performance measure which corresponds to a power limit on the computing components using the cluster power model, and setting individual power budgets for the computing components based on the optimum set point and the component power models such that each of the computing components operate at a generally equal performance level according to the performance measure, wherein said setting includes allocating a greatest power budget to a least efficient one of the computing components.

17. The computer program product of claim 16 wherein the component power models are created in real time by monitoring power consumption and the performance measure to derive sets of data points for the computing components, and performing regression on the sets of data points to yield power models for the computing components.

18. The computer program product of claim 16 wherein the computing components have one or more processors and the performance measure is processor speed.

* * * * *